United States Patent
Tari

(10) Patent No.: US 6,696,968 B2
(45) Date of Patent: Feb. 24, 2004

(54) VISUALIZATION LUMINOUS DEVICE ADAPTED FOR ELECTRIC MOTORS OF EQUIPMENTS SUPPLIED BY THE THREE-PHASE VOLTAGE

(76) Inventor: Josette Tari, 2135 Carre Mauger, Quebec (CA), G2B 1Y4

( * ) Notice: Subject to any disclaimer, the term of this patent is extended or adjusted under 35 U.S.C. 154(b) by 0 days.

(21) Appl. No.: 09/794,995

(22) Filed: Feb. 28, 2001

(65) Prior Publication Data

US 2002/0118117 A1 Aug. 29, 2002

(51) Int. Cl.[7] .............................................. G08B 21/00
(52) U.S. Cl. ..................... 340/635; 340/660; 340/652; 340/649; 340/648
(58) Field of Search ................................ 340/635, 648, 340/649, 650, 660, 652, 853.1, 853.2, 854.3

(56) References Cited

U.S. PATENT DOCUMENTS

| | | | | |
|---|---|---|---|---|
| 4,176,350 A | * | 11/1979 | Patterson | ..................... 340/644 |
| 4,901,005 A | * | 2/1990 | Shin et al. | ..................... 324/86 |
| 5,594,333 A | * | 1/1997 | Whipple, III | ................ 324/142 |
| 5,659,206 A | * | 8/1997 | Taguchi et al. | ................ 367/11 |
| 6,184,795 B1 | * | 2/2001 | Johnson | ....................... 340/648 |
| 6,304,189 B1 | * | 10/2001 | Koch et al. | .................. 340/644 |

* cited by examiner

*Primary Examiner*—Benjamin C. Lee

(57) ABSTRACT

The present invention is a visualization luminous device adapted for electric motors of equipments supplied by three-phase voltage, allowing a person to visualize with certainty whether there is presence of voltage downstream blades of a disconnecting switch or circuit breakers which had been placed in an off-position.

5 Claims, 5 Drawing Sheets

VISUALIZATION LUMINOUS DEVICE ADAPTED FOR ELECTRIC MOTORS OF EQUIPMENTS SUPPLIED BY THE THREE-PHASE VOLTAGE

BACKGROUND OF THE INVENTION

1. Field of the Invention

The present invention relates to a visualization luminous device adapted for electric motors of equipments supplied by three-phase voltage, allowing a person to visualize with certainty whether there is presence of voltage downstream blades of a disconnecting switch or circuit breakers which had been placed in an off-position.

2. Description of the Related Art

A search of prior art records has unveiled the following patents:

1. U.S. Pat. No. 5,659,206 issued in 1997 to Taguchi; and
2. U.S. Pat. No. 4,901,005 issued in 1990 to Shim.

As can be seen the patents to Taguchi and Shim are probably the most relevant. The patent to Taguchi shows an electrical circuit having a voltage detector constituted of a battery as power source, in order to continue to receive adequate power when the battery voltage drops due to operation of the high current load circuit, and the patent to Shim shows a voltage zero detector for power systems including three voltage phases (A)(B)(C) Visualization luminous device adapted for electric motors of equipments supplied by three-phase voltage. adapted at the output of an electric input, which the first input is connected to the first output of the first voltage measurement device, and which the second input is connected at the second output of the second voltage measurement device, for generating a signal when the first measured voltage is equal to and opposite in polarity from the second measured voltage.

At present a certain number of devices or apparatus we sold on the market but they are really different from my invention, because any one shows a visualization luminous device adapted for electric motors of equipments supplied by three-phase voltage.

During the maintenance of the electric equipments, after that a disconnecting switch or circuit breakers are placed in an off-position, are you really sure to 100% that they are not more voltage? The three-phase voltage constantly threatens the workers working to the maintenance of the electric equipments. Why is this so dangerous? Because that it is always difficult to be absolutely sure that the voltage is not present on the equipments in maintenance.

The human errors and hazardous environments present a serious Visualization luminous device adapted for electric motors of equipments supplied by three-phase voltage. threat for the workers in manufacturing plant caused by:

Incorrect measurement set up;

Misreadings or misconfigurations of the voltmeter;

Lapse of concentration or distraction;

Carbon deposits giving a path for the electrical current;

The voltmeter and/or the defective accessories;

Sticking switch blades;

Double accidental feeding of electric equipments; and

The defective electronic circuit breakers (visual inspection often difficult to carry out).

ADVANTAGES OF THE INVENTION

The device is entirely encased in epoxy, resists to the humidity, dust and vibrations;

The device detects any voltage or any current leakage greater than 2 mA;

The device is easy to install;

The device comprises the red lights at low current which the visual indication of the red lights is not affected by the ambient light;

Visualization luminous device adapted for electric motors of equipments supplied by three-phase voltage.

The device comprises a voltage reduction universal kit which allow the device to operate on 208 volts, 480 volts or 600 volts; and The device is conceived to be connected to a link to ground or to a valid artificial neutral.

SUMMARY OF THE INVENTION

The gist of the invention is therefore to provide a visualization luminous device adapted for electric motors of equipments supplied by three-phase voltage, allowing a person to visualize with certainty whether there is presence of voltage downstream blades of a disconnecting switch or circuit breakers which had been placed in an off-position.

The present invention shows a visualization luminous device increasing in a radical way the security of the people assigned to the works of maintenance on the electric equipments supplied by three-phase voltage, because too a long time that the voltage will be present downstream blades of the disconnecting switch, one or more red lights of the device will remain lit. A rapid and visual inspection indicates if the electric system had been placed in an off-position. Visualization luminous device adapted for electric motors of equipments supplied by three-phase voltage.

DETAILED DESCRIPTION OF THE INVENTION

Figure 1:
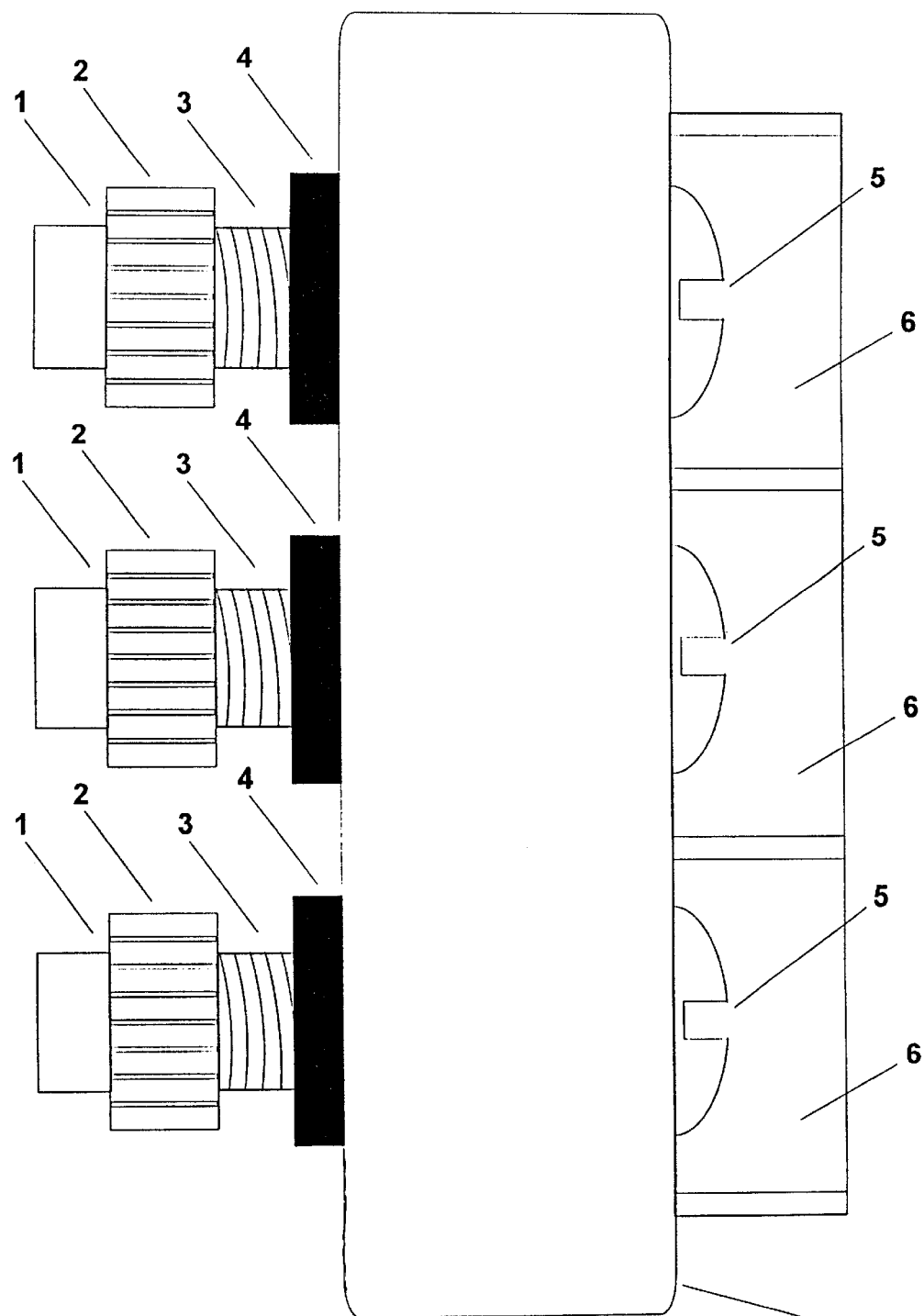
FIG. 1 is a side view of a visualization luminous device.
Figure 2:
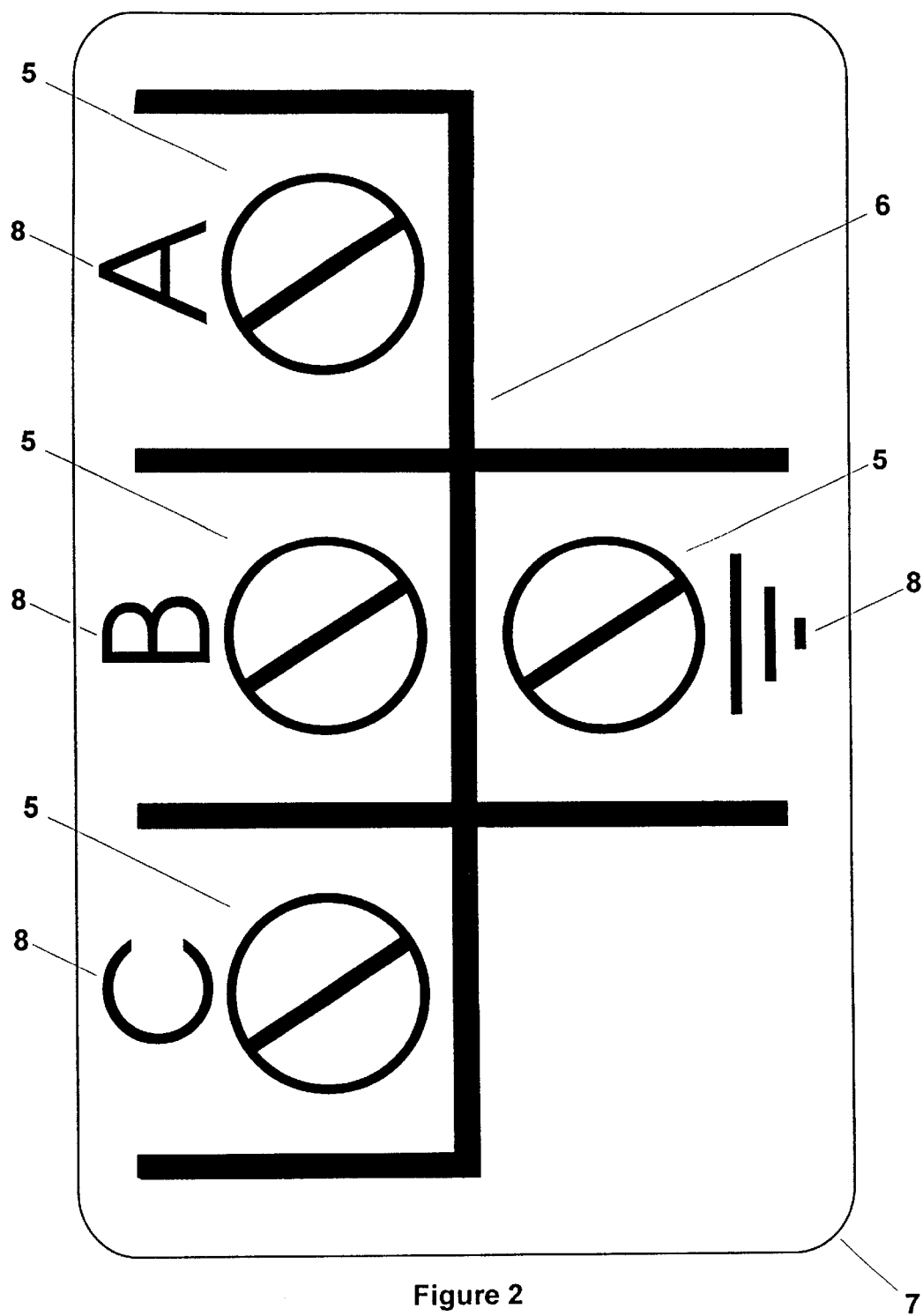
FIG. 2 is a rear view thereof.
Figure 3:
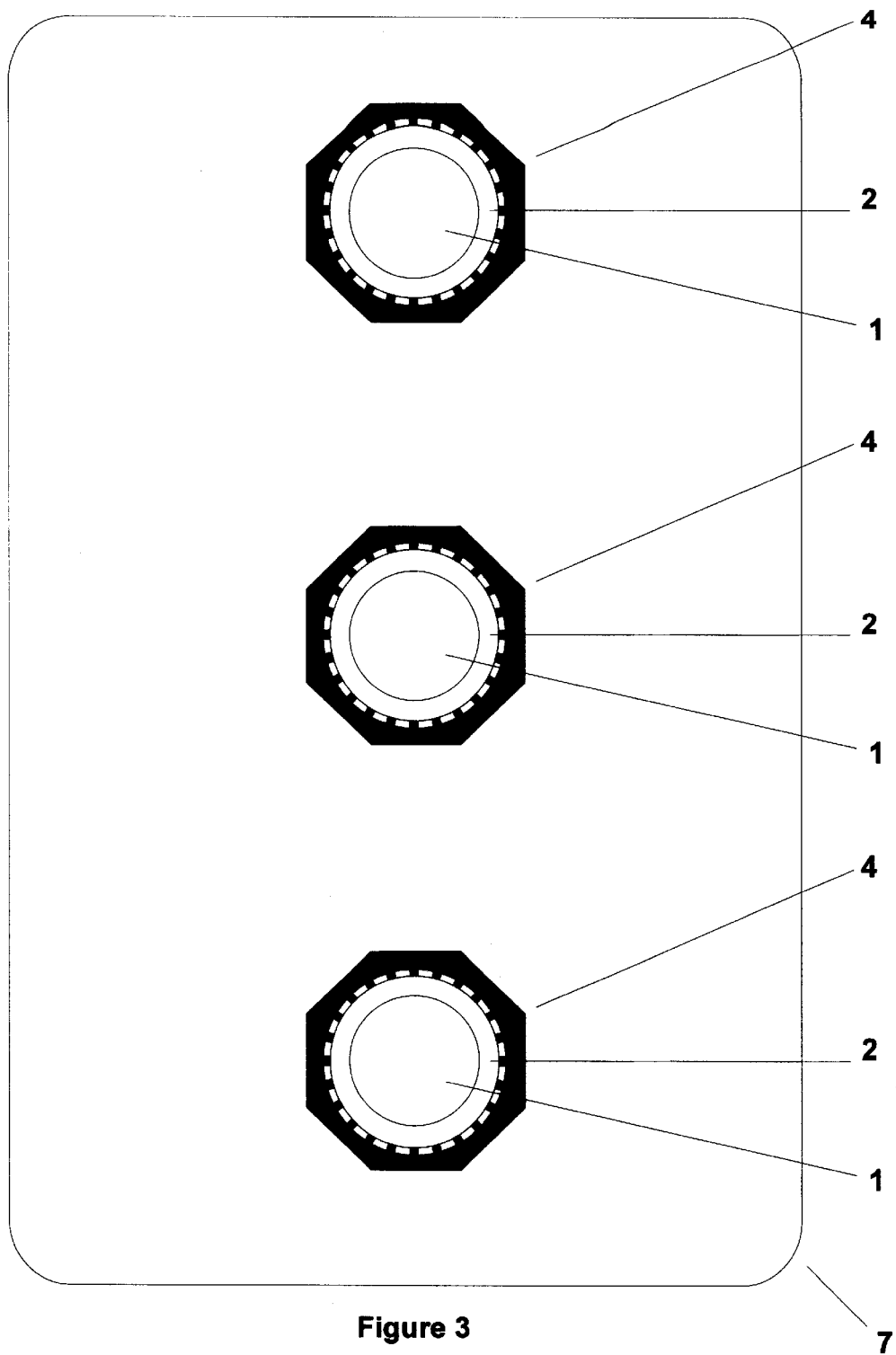
FIG. 3 is a front view thereof.
Figure 4:
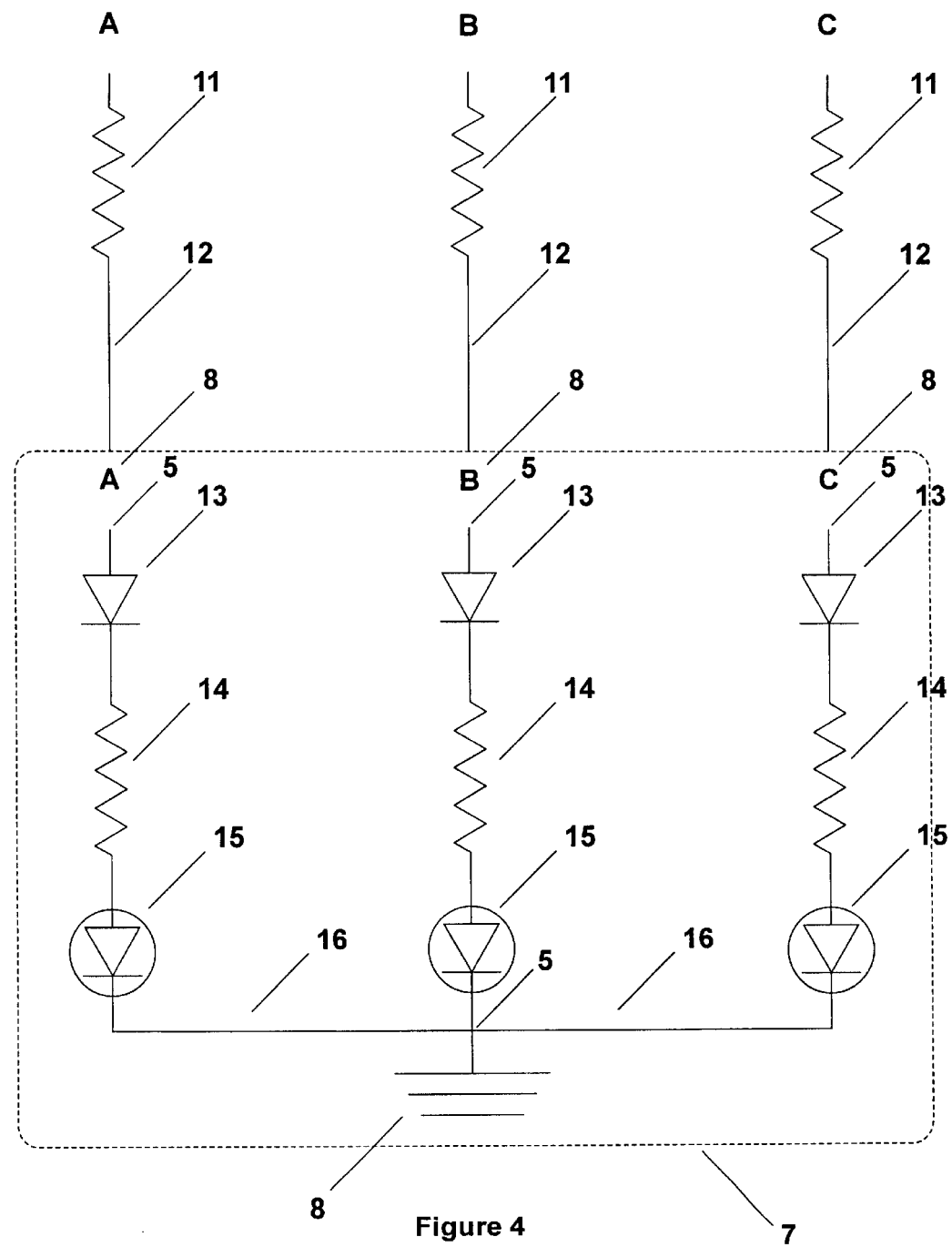
FIG. 4 is an internal schematic representation of the visualization luminous device.
Figure 5:
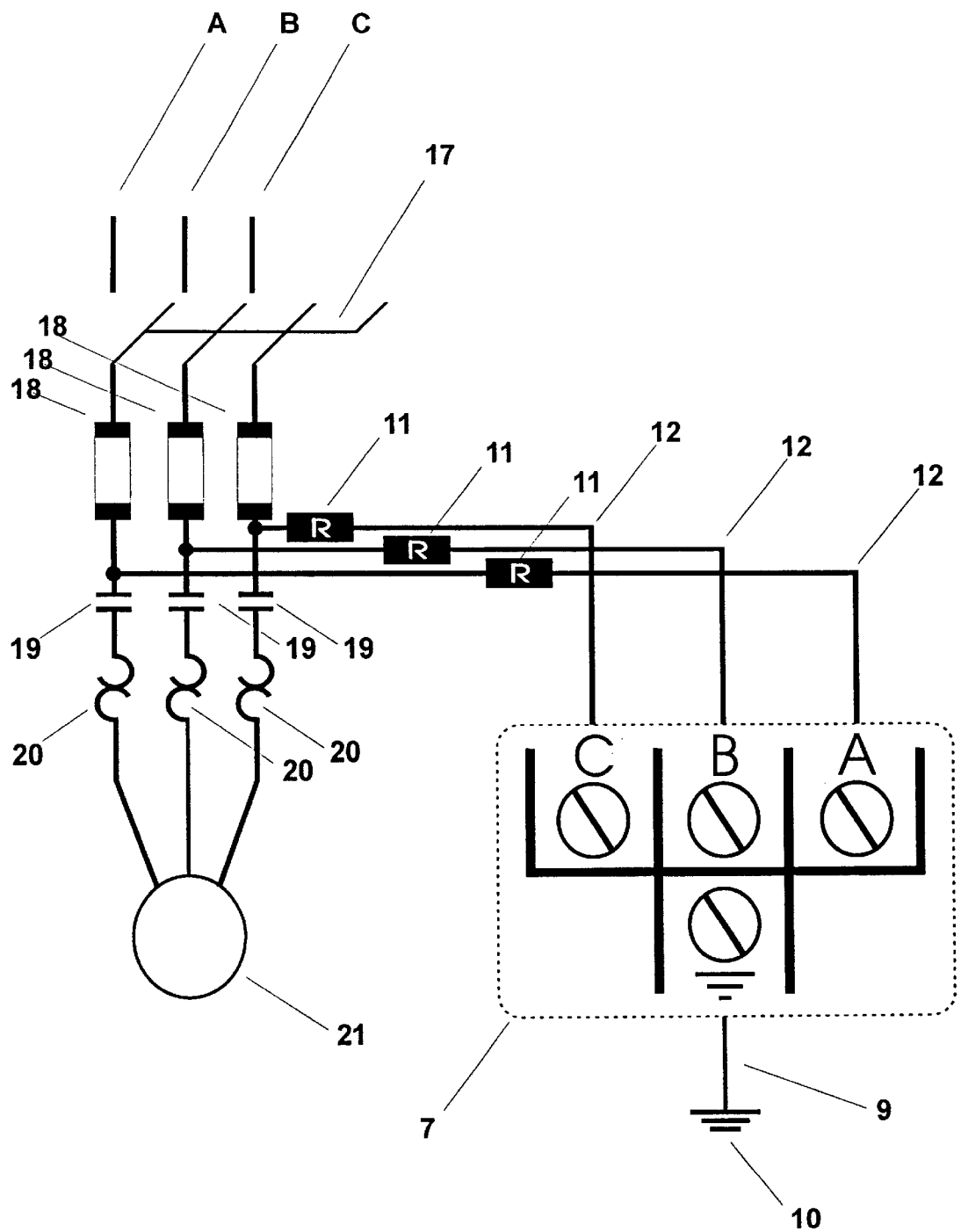
FIG. 5 is a schematic representation of wiring link connected to the visualization luminous device and to an electric motor.

Referring to the FIGS. 1 to 5, it may be seen that the vizualisation luminous device of the present invention is adapted for electric motors of equipments supplied by three-phase voltage, allowing a person to visualize with certainty whether there is presence of voltage downstream blades of a disconnecting switch or circuit breakers which had been placed in an off-position, comprising a plurality of red translucent polycarbonate lenses (1) each being engaged inside a red threaded polycarbonate lens (2) that is in turn being screwed to a threaded polycarbonate socket (3) each being fixed Visualization luminous device adapted for electric motors of equipments supplied by three-phase voltage. to a hexagonal nut (4) in black polycarbonate being connected to a case (7) of a device in polycarbonate filled with epoxy.

A plurality of metal screws (5) are connected to case (7) and individually bounded by a polycarbonate separator (6) allowing a wiring link (12) from each of screws to each of a plurality of diodes (13) connected to a corresponding resistance (14) being connected to a red light (15) that is being fitted to a corresponding one of red translucent polycarbonate lenses.

The resistances (11) of a wiring kit are connected to device by wires (12), and the metal screws (5) provide connection of the wires (12) to the diodes (13) through metal screws (5), and the red lights (15) are commonly connected by wires (16) and (9) to an electric ground (10) of device.

A plurality of wires are connected to device and to an electric motor (21) by means of electric components including a disconnecting switch (17) and a plurality of fuses (18), magnetic contactors (19) and overload relays (20).

The wiring link connected to device and to electric motor (21) is identified by a plurality of letters and electric signs (8). Visualization luminous device adapted for electric motors of equipments supplied by three-phase voltage.

Legend

1=Red translucent polycarbonate lenses
2=Red threaded polycarbonate lenses
3=Threaded polycarbonate sockets
4=Black polycarbonate hexagonal nuts
5=Metal screws
6=Polycarbonate separators
7=Case of the device in polycarbonate filled with epoxy
8=Letters and electric signs
9=Wire connected to an electric ground of device
10=Electric Ground
11=Resistances of wiring Kit
12=Wires being connected to the resistances and to device
13=Diodes connected to the resistances
14=Resistances connected to the red lights
15=Red lights
Visualization luminous device adapted for electric motors of equipments supplied by three-phase voltage.

16=Wire connecting red lights to electric ground of device
17=Disconnecting switch
18=Fuses
19=Magnetic contactors
20=Overload Relays
21=Electric motor
A=Phase A
B=Phase B
C=Phase C Although only a single embodiment of the present invention has been described and illustrated, the present invention is not limited to the features of this embodiment, but includes all variations and modifications within the scope of claims.

What is claimed is:

1. A visualization luminous device adapted for electric motors of equipments supplied by three-phase voltage, allowing a person to visualize with certainty whether there is presence of voltage downstream blades of a disconnecting switch or circuit breakers which had been placed in an off-position, comprising:

a plurality of red translucent polycarbonate lenses each being engaged inside a red threaded polycarbonate lens that is in turn being screwed to a threaded polycarbonate socket, said threaded sockets each being fixed to a hexagonal nut in black polycarbonate, said hexagonal nuts being connected to a case of said device in polycarbonate filled with epoxy; and a plurality of metal screws are connected to said case and individually bounded by a polycarbonate separator allowing a wiring link from each of said screws to each of a plurality of diodes connected to a corresponding resistance, each said resistance being connected to a red light that is being Visualization luminous device adapted for electric motors of equipments supplied by three-phase voltage, fitted to a corresponding one of said red translucent polycarbonate lenses.

2. The visualisation luminous device of claim 1, wherein resistances of a wiring kit are connected to said device by wires, and said metal screws provide connection of said wires to said diodes through said metal screws, and said red lights are commonly connected to an electric ground of said device.

3. The device of claim 1 or 2, wherein a plurality of wires are connected to said device and to an electric motor by means of electric components including a disconnecting switch and a plurality of fuses, magnetic contactors and overload relays.

4. The device of claim 1 or claim 2, wherein identification means are used for said wiring links which are connected to said device and to an electric motor, said identification means includes a plurality of letters and electric signs.

5. The device of claim 3, wherein identification means are used for said wiring links which are connected to said device and to said electric motor, said identification means includes a plurality of letters and electric signs.

* * * * *